United States Patent [19]

Almén

[11] 4,178,774
[45] Dec. 18, 1979

[54] ABSORPTION REFRIGERATION APPARATUS

[75] Inventor: Karl-Gosta Almén, Joinville, Brazil

[73] Assignee: Consul S. A., Joinville,, Brazil

[21] Appl. No.: 939,070

[22] Filed: Sep. 1, 1978

[30] Foreign Application Priority Data

Sep. 8, 1977 [BR] Brazil .................................... 54509

[51] Int. Cl.² ............................................ F25B 15/10
[52] U.S. Cl. .................................................... 62/493
[58] Field of Search .................................. 62/490–493

[56] References Cited

U.S. PATENT DOCUMENTS

| 2,855,766 | 10/1958 | Elfving et al. | 62/493 |
| 3,760,602 | 9/1973 | Blomberg | 62/493 |

FOREIGN PATENT DOCUMENTS

888601  1/1962  United Kingdom ...................... 62/493

*Primary Examiner*—Lloyd L. King
*Attorney, Agent, or Firm*—Wegner, Stellman, McCord, Wiles & Wood

[57] ABSTRACT

An absorption refrigerating system for use with refrigerant and inert auxiliary gas. The system includes a generator, a condenser, an evaporator structure and an absorber in circuit with each other. The evaporator structure is arranged to effect a two-stage precooling operation including precooling of the incoming weak auxiliary gas and liquid refrigerant, utilizing for the final precooling of the gas evaporation of a part of the refrigerant into a small partial stream of weak gas and to effect final precooling of the liquid refrigerant by leading it in contracurrent to the gas through a flat evaporator coil such as utilized for cooling the freezer compartment of a refrigerator.

8 Claims, 2 Drawing Figures

FIG. I
PRIOR ART

ABSORPTION REFRIGERATION APPARATUS

BACKGROUND OF THE INVENTION

The present invention relates to an absorption refrigerating system for use with refrigerant and inert auxiliary gas. Absorption refrigerating systems of this type conventionally use ammonia as the refrigerant, water as the absorbent, and hydrogen as the auxiliary gas, although other substances or combinations thereof may be used in some systems.

The functioning of a system of this type is well known to those skilled in the art. Basically, the system functions as follows: through the application of heat energy to a generator, pure refrigerant vapor is produced, condensed in a condenser and fed to an evaporator, where it evaporates at a low temperature into an atmosphere of auxiliary gas, weak in refrigerant vapor. To maintain evaporation at a constant low temperature, a steady supply to the evaporator of fresh weak gas is necessary. This is achieved through a circulation of gas between the evaporator, where it is enriched, and the absorber where it is regenerated through absorption of refrigerant vapor into an absorbent-refrigerant solution.

The amount of refrigeration generated depends on the amount of refrigerant evaporated in the evaporator. The temperature at which the evaporation occurs, ideally, is the saturation temperature of the weak gas. In reality, however, this temperature is higher, depending on such factors as surface loading of the evaporator and of the degree of precooling of the refrigerant and weak gas entering the evaporator.

One form of well known evaporator structure allows, in the ideal case, precooling of the incoming media down to the minimum temperature of the evaporator, and thus realizes, ideally, an evaporation temperature equal to the saturation temperature of the weak gas. This is achieved by dispensing the refrigerant and weak gas conduits in heat exchange contact with the evaporator tube through its entire length up to an initial point.

For big refrigerators, however, especially when the coldest part of the evaporator is formed as a flat coil for high ice-making capacity, this arrangement causes problems in the manufacture of a long and continuous coil containing three ducts in parallel. Further, the material cost thereof is high. Further, such a coil, when coaxial tubes are used, has a tendency to become blocked by liquid refrigerant collecting in it and, thus, raises serious operational problems.

SUMMARY OF THE INVENTION

It is a principal object of the present invention to overcome the aforementioned disadvantages. A more particular object of the present invention is to achieve a circuit layout of the evaporator structure which, in the ideal case, makes possible a precooling of the weak gas and liquid refrigerant down to the saturation temperature of the weak gas, without the necessity of piping the weak gas and liquid refrigerant in continuous heat exchange with the entire length of the evaporator tube, and especially with a flat coil of evaporator tubing such as utilized for ice-making and/or cooling of a freezer compartment of a refrigerator.

In pursuance of the above object, one feature of the invention is that the final precooling of the weak gas occurs when it passes through a duct which is in heat exchange contact with another duct, through which passes precooled liquid refrigerant and a part of the stream of the precooled weak gas.

Another feature of the invention is that the final precooling of the refrigerant takes place in the evaporator coil proper, by introducing it at the warmer end of the coil and allowing it to flow through the evaporator coil in countercurrent to the gas.

BRIEF DESCRIPTION OF THE DRAWING

The novel features which are considered as characteristic for the invention are set forth in particular in the appended claims. The invention itself, however, both as to its construction and mode of operation, together with additional objects and advantages thereof, will be best understood from the following description of a specific embodiment when read in connection with the accompanying drawing wherein:

DESCRIPTION OF THE PREFERRED EMBODIMENT

Figure 1:
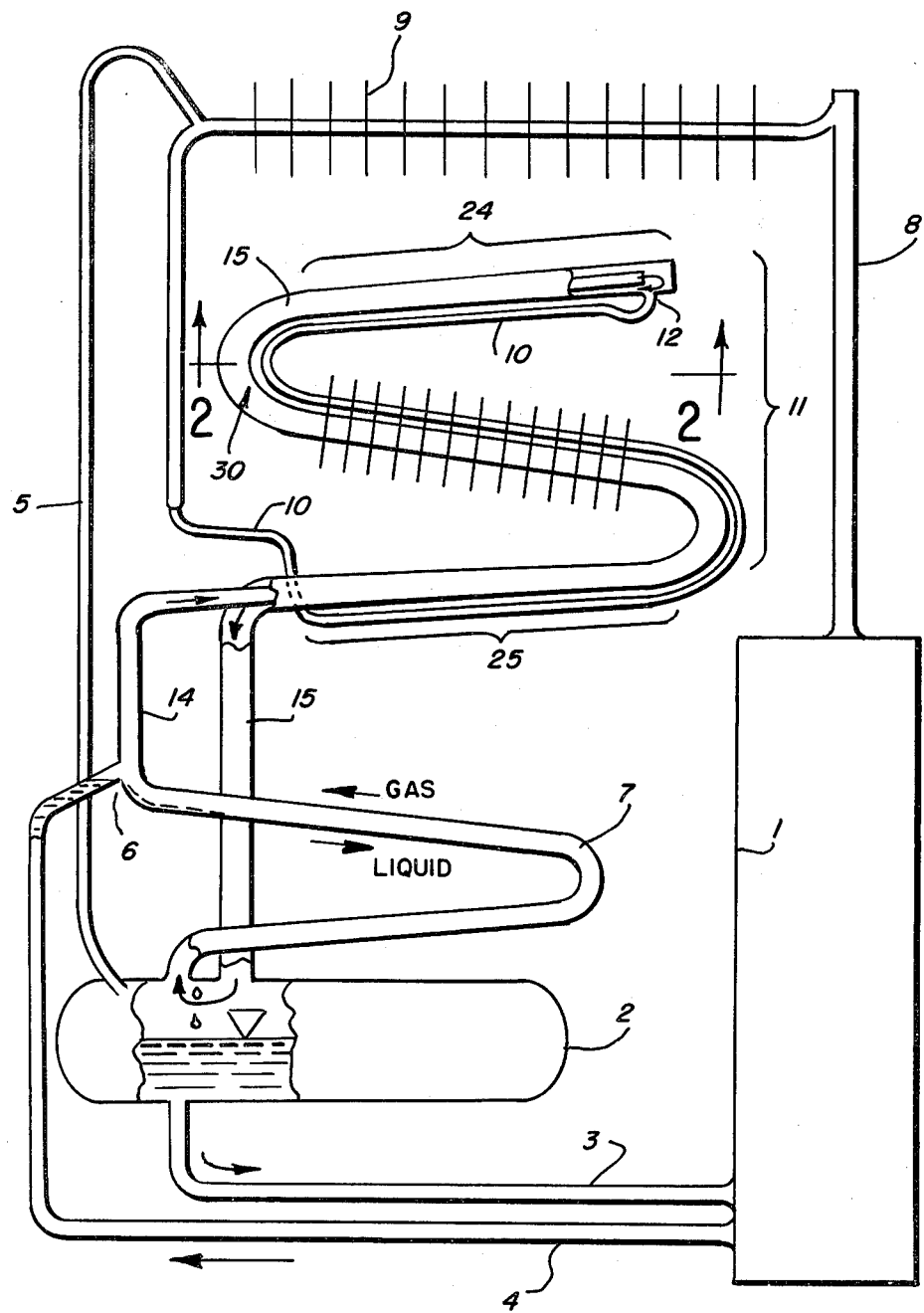
FIG. 1 is a schematic illustration of an absorption refrigerating system according to prior art.

A conventional prior art absorption refrigerating unit for use with an inert auxiliary gas is shown diagrammatically in FIG. 1.

The unit illustrated functions basically in the following manner. A generator 1 receives from a vessel 2 a supply of rich solution, i.e. absorbent, such as water, with a high concentration of refrigerant. The rich solution is supplied by gravity action through a tube 3. The generator functions essentially as a distillation device, utilizing heat energy supplied to it to divide the incoming rich solution into pure refrigerant vapor and weak solution, i.e. solution with a low percentage of refrigerant.

Generator 1 further has a pumping function in that it elevates the weak solution to a level sufficient to allow it to pass by gravity action through a tube 4 to an entrance point 6 where it enters into an absorber coil 7.

The refrigerant vapor passes up through a tube 8 to a condenser 9, which conventionally consists of one or more tubes equipped with fins or similar devices to dissipate the heat of condensation of the vapor. In the condenser 9, the vapor condenses and passes as liquid through a tube 10 to an evaporator structure 11, where it enters at one end portion 12. The condenser 9 is located sufficiently above portion 12 to allow the liquid refrigerant to pass to portion 12 by gravity action.

Between the condenser 9 and vessel 2 is a pressure-equalizing conduit 5. The absorber coil 7 consists of a coil of tubing with a slight inclination to the horizontal permitting the weak solution to pass by gravity action as a stream at the bottom of tube 7 from the entrance point 6 to a lowest point 13 where it enters into the absorber vessel 2. Rich gas, i.e. inert gas mixed with a high percentage of refrigerant vapor, flows upwardly through the absorber coil 7 from the lowest point 13. The rich gas flows upwardly through coil 7 in countercurrent to the liquid refrigerant which absorbs part of the refrigerant vapor out of the gas so that the gas reaches entrance point 6 as weak gas, i.e. with a low concentration of refrigerant vapor. In a similar way, the weak liquid, which enters at 6, is enriched with refrigerant during its passage through 7 and enters the absorber vessel 2 at 13 as a rich solution.

The weak gas leaving the absorber 7 at 6 flows upwardly through a tube 14 to the evaporator structure 11. The rich gas leaves the evaporator structure 11 through a tube 15 and flows by gravity action to the vessel 2.

Figure 2:
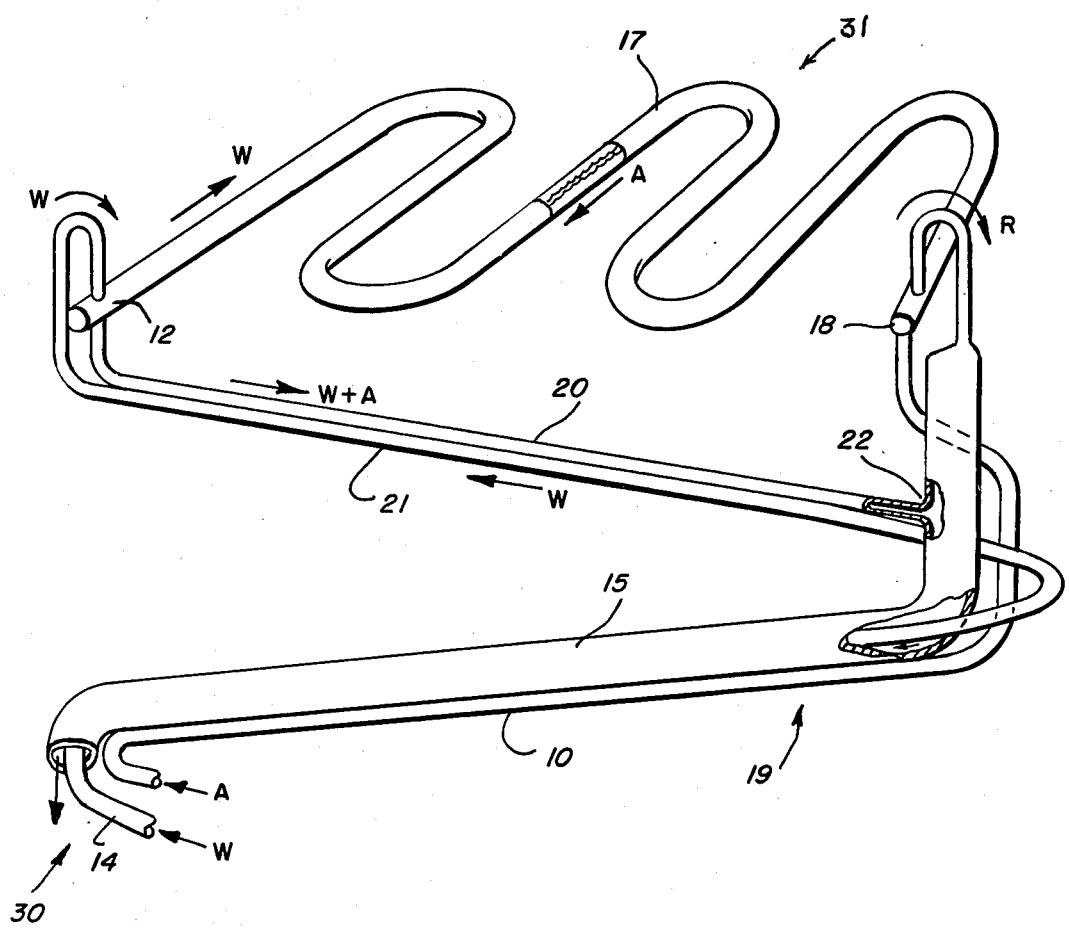
FIG. 2 is a schematic representation of an improved portion of such a system embodying the invention taken looking from line 2—2.

Referring now more specifically to FIG. 2 illustrating the improved evaporator structure 31 embodying my invention, an improved two-stage precooling operation is effected to provide an improved operation of such an absorption refrigeration system. Figures given herefollowing as examples are based on the use of working media of ammonia, water and hydrogen as the refrigerant, absorbent and auxiliary gas, respectively.

The liquid refrigerant is conducted to the evaporator structure 31 via tube 10, and enters into the evaporator tube 15 at point 12, as seen in FIG. 2. Weak gas passes from the absorber 7 through tube 14 and enters into evaporator tube 15 also at point 12. The two media pass together down tube 15 through the evaporator structure and back to the vessel 2, the liquid evaporating into the gas in the evaporation, thereby creating the refrigeration.

The weak gas entering the evaporator structure has a low content of ammonia vapor and, thus, a low partial pressure of ammonia, so that liquid ammonia can evaporate into the gas already at a low temperature. A typical value for the ammonia partial pressure in the weak gas is 1.0 atmospheres, which corresponds to a saturation temperature of −34° C. On its way through tube 15, the ammonia evaporates into the gas, which gets gradually enriched with ammonia vapor, the partial pressure of ammonia increases, and the rich gas leaving the evaporator structure 31 might, as a typical value, have an ammonia partial pressure of 3.7 atmospheres which corresponds to a saturation temperature of −5° C.

The refrigeration effect of the evaporator is caused by the evaporation of ammonia. As was shown, the accompanying enrichment of the gas causes the evaporation temperature to rise along the evaporator tube 15. For this reason, the first and coldest part 24 of the tube 15 adjacent to point 12 is normally used for maximum cooling, such as of a freezer compartment, which must be maintained at a temperature well below the freezing point. The less cold portions of the tube 15 are normally used for cooling the main compartment of a refrigerator, which may be kept at a temperature above the freezing point. For this purpose, the evaporator may be equipped with a finned portion 16 to improved heat transfer from that part of the evaporator structure to the air in the refrigerated compartment. A third part 25 is used solely for heat exchange between incoming refrigerant and weak gas and outgoing rich gas, as will be explained more fully below. The liquid ammonia entering the evaporator structure through tube 10 and the weak gas entering through tube 15 have temperatures above the ambient temperature, whereas the evaporator structure has a temperature below the ambient temperature which, at the coldest point 12, is a temperature considerably below the ambient. If the ammonia and weak gas were introduced into tube 15 at end 12 without previous precooling, a good portion of the ammonia would have to be evaporated merely to cool down the incoming media to the temperature prevailing at point 12. Thus, part of the energy of the system would be wasted without contributing to the useful cooling output thereof. Further, the gas would be enriched by ammonia vapor which would diminish its capacity for creating the desired low temperatures. Thus, to create an efficiently operating evaporator with good economy and with the cooling output at the lowest possible temperature, one must provide for precooling of the incoming media. This may be done by bringing the warmer tubes 10 and 14 in heat exchange with the colder evaporator tube 15. The thermodynamically most efficient way to do this is to bring the tubes together to have the fluid flow contracurrent flow through the whole evaporator structure 11, as shown in FIG. 1.

Thus, ideally, in the conventional refrigeration system as illustrated in FIG. 1, it would theoretically be possible to reach, at port 12, the saturation temperature of the weak gas which is the lowest temperature attainable in the evaporator of this type of refrigerating system.

My invention is shown in detail in FIG. 2 illustrating the evaporator structure beyond portion 30 of the refrigeration system. As shown, evaporator coil 17 is a substantially flat coil of evaporator tubing arranged substantially horizontally as in a freezer or similar compartment of a refrigerator. Its coldest end is at port 12, where the precooled weak gas W enters in contact with the liquid ammonia A introduced at the other end 18. The weak gas passes through coil 17 from end 12 to end 18 and during this passage is gradually enriched with ammonia vapor evaporating from the liquid ammonia at the bottom of the tube. At end 18, therefore, the weak gas is richer than at end 12 and the temperature of evaporation is consequently higher. The liquid ammonia entering at coil end 18 passes through coil 17 to end 12 countercurrently to the gas flow. During this passage, part of the liquid evaporates to create the desired cooling output. A portion of the liquid evaporates into the successively weaker gas causing a successive lowering of the temperature of the remaining liquid which, thus, is precooled in a near perfect manner up to coil end 12.

Only a portion of the refrigerant liquid evaporates in coil 17, the remainder passing down through tubes 20 to evaporate in the lower portion 15 of the evaporator structure to cool, for example, the main compartment of a refrigerator.

The semirich gas leaving the coil 17 at end 18 passes downwardly through tube 15 and comes into heat exchange with the incoming fluids media in ducts 10 and 14 at portion 19 thereof. The liquid ammonia in duct 10, ideally, may be precooled to the temperature prevailing at duct portion 19 and, thus, is preferably introduced into coil end 18 and not into end 12 where the temperature would be lower. The weak gas flowing upwardly through tube 14 to portion 19 is precooled through a thermal exchange between tubes 14 and 15. As the ammonia in tube 10 can theoretically be precooled only to the temperature prevailing at portion 19, the weak gas must be introduced at coil end 12 where the temperature is lower. Thus, the weak gas requires some additional precooling which is achieved by leading the liquid ammonia not evaporated in coil 17 from end 12 through duct 20 in heat exchange relationship with the final portion 21 of the weak gas conduit 14. The heat capacity of the ammonia flowing through duct 20 is substantially less than the heat capacity of the weak gas flowing through duct 21 and, thus, alone would not sufficiently precool the weak gas. Additional precooling is therefore achieved by making the tube large enough also to allow for passage of a portion of the weak gas through it.

The gas introduced at coil end 12 thus can reach point 22 in two ways, i.e. through coil 17 as earlier described, or through duct 20. The ratios of the gases may be adjusted by suitably tuning the flow resistances of the two flow passages. Such adjustment should be accurately effected in order to not detract from the main coil 17 more weak gas than is absolutely necessary for the precooling of the gas in duct 21. Tube 20 may be internally serrated or provided with an insert of wire mesh or helically wound wire in a conventional manner in order to facilitate the evaporation of the refrigerant into the gas.

The initial precooling of the weak gas and liquid may be made in a conventional manner, i.e. ducts 10, 14 and 15 are arranged in heat exchange relationship with one another in the evaporator structure up to point 19. This contact may be continuous through their entire length or, if desired, tubes 10 or 14 may be allowed to bypass certain sections of tube 15, e.g., a finned section for cooling a refrigerator main compartment.

I claim:

1. In an absorption refrigeration apparatus utilizing refrigerant and inert gas fluids and consisting of a generator, a condenser, an absorber, and an evaporator structure having a first portion and a substantially horizontal coil defining a coldest portion and a warmest portion, all interconnected with one another, improved means for effecting a two-stage precooling of liquid refrigerant and weak refrigerant and auxiliary gas media in said apparatus, said means comprising:
    means for effecting an initial precooling of the weak gas media and liquid refrigerant through heat exchange thereof with said first portion of the evaporator structure;
    means for effecting a final precooling of the weak gas media by conducting the initially precooled weak gas media in heat exchange relationship with a tube through which flows liquid refrigerant and a portion of the initially precooled weak gas media and delivering the finally precooled weak gas media to said coldest portion of the evaporator coil;
    means for introducing the initially precooled refrigerant to said warmest portion of said evaporator coil; and
    means for flowing said refrigerant from said warmest portion through said evaporator coil in countercurrent to the stream of weak gas media flowing through it from said coldest portion to said warmest portion.

2. The absorption refrigeration apparatus of claim 1 wherein said means for effecting said initial precooling comprises a first thermally conductive duct for conducting low temperature rich gas from said evaporator coil, a second thermally conductive duct within said first duct for precooling and conducting weak gas to said evaporator coil, and a third thermally conductive duct in heat exchange relationship to said first duct for precooling and conducting liquid ammonia to said evaporator coil.

3. The absorption refrigeration apparatus of claim 1 wherein said means for effecting said initial precooling comprises a first thermally conductive duct for conducting low temperature rich gas from said evaporator coil, a second thermally conductive duct within said first duct for precooling and conducting weak gas to said coldest portion of the evaporator coil, and a third thermally conductive duct in heat exchange relationship to said first duct for precooling and conducting liquid ammonia to said evaporator coil.

4. The absorption refrigeration apparatus of claim 1 wherein said means for effecting said initial precooling comprises a first thermally conductive duct for conducting low temperature rich gas from said evaporator coil, a second thermally conductive duct within said first duct for precooling and conducting weak gas to said evaporator coil, and a third thermally conductive duct in heat exchange relationship to said first duct for precooling and conducting liquid ammonia to said warmest portion of the evaporator coil.

5. The absorption refrigeration apparatus of claim 1 wherein said means for effecting said initial precooling comprises a first thermally conductive duct for conducting low temperature rich gas from said warmest portion of the evaporator coil, a second thermally conductive duct within said first duct for precooling and conducting weak gas to said evaporator coil, and a third thermally conductive duct in heat exchange relationship to said first duct for precooling and conducting liquid ammonia to said evaporator coil.

6. The absorption refrigeration apparatus of claim 1 wherein said means for effecting said initial precooling comprises a first thermally conductive duct for conducting low temperature rich gas from said evaporator coil, a second thermally conductive duct within said first duct for precooling and conducting weak gas to said coldest portion of the evaporator coil, and a third thermally conductive duct in heat exchange relationship to said first duct for precooling and conducting liquid ammonia to said warmest portion of the evaporator coil.

7. The absorption refrigeration apparatus of claim 1 wherein said means for effecting said initial precooling comprises a first thermally conductive duct for conducting low temperature rich gas from said warmest portion of the evaporator coil, a second thermally conductive duct within said first duct for precooling and conducting weak gas to said coldest portion of the evaporator coil, and a third thermally conductive duct in heat exchange relationship to said first duct for precooling and conducting liquid ammonia to said evaporator coil.

8. The absorption refrigeration apparatus of claim 1 wherein said means for effecting said initial precooling comprises a first thermally conductive duct for conducting low temperature rich gas from said warmest portion of the evaporator coil, a second thermally conductive duct within said first duct for precooling and conducting weak gas to said coldest portion of the evaporator coil, and a third thermally conductive duct in heat exchange relationship to said first duct for precooling and conducting liquid ammonia to said warmest portion of the evaporator coil.

* * * * *